UNITED STATES PATENT OFFICE.

JOHN W. HOWLAND, OF EMMETT, IDAHO.

PAINTING COMPOSITION.

1,402,500. Specification of Letters Patent. Patented Jan. 3, 1922.

No Drawing. Application filed August 30, 1920. Serial No. 406,830.

*To all whom it may concern:*

Be it known that I, JOHN W. HOWLAND, a citizen of the United States, residing at Emmett, in the county of Gem and State of Idaho, have invented certain new and useful Improvements in Painting Compositions; and I do declare the following to be a full, clear, and exact description of the invention, such as will enable others skilled in the art to which it appertains to make and use the same.

This invention relates to painting compositions, and the main object is to provide an improved composition which will adhere to and protect most every kind of solid surface, including wood, iron, stone, brick, cement-concrete, canvas, cloth, etc., and which is water-proof, rat-proof, and will not cause shrinkage of canvas or other cloth to which it is applied.

Other objects and advantages will be pointed out or implied in the following details of description.

In carrying the invention into practice, I employ coal-tar, spirits of turpentine, benzine, black asphaltum, carbolic acid and sulphuric acid. These ingredients are mixed together in the following proportions, viz., fifty gallons of coal-tar, one gallon of spirits of turpentine, five pints of benzine, six pints of black asphaltum, one pint of carbolic acid, and one and one-half pints of sulphuric acid. After permitting the mixture to stand for twelve hours while being thoroughly stirred at intervals, it is ready for application in the same manner that ordinary paint is applied, that is, where the paint is to be used as a surface coating on wood, metal, etc. However, for water-proofing canvas or other cloth, the above defined mixture should be thinned with turpentine in the proportion of one-third turpentine and two-thirds of said mixture.

I have found that when a little unslacked lime is mixed with the above described paint composition and this mixture is spread upon a board or any other surface, it will harden or set and present an appearance very similar to cement. The paint composition may also advantageously be mixed with a little cement to produce a similar result.

In the composition the carbolic acid acts as a poison to make it rat proof. The sulphuric acid serves to dissolve and take the foul and solid matter out of the coal tar.

It is not intended to limit this invention to the exact proportions stated, but changes may be made within the scope of the appended claims.

I claim:

1. A painting composition of the class described including coal-tar, spirits of turpentine, benzine, black asphaltum, carbolic acid and sulphuric acid.

2. A painting composition of the class described including fifty gallons of coal tar, one gallon of spirits of turpentine, five pints of benzine, six pints of black asphaltum, one pint of carbolic acid and one and one-half pints of sulphuric acid.

3. A painting composition of the class described compounded from coal tar, spirits of turpentine, benzine, black asphaltum, carbolic acid, sulphuric acid and unslacked lime.

In testimony whereof I have hereunto set my hand.

JOHN W. HOWLAND.